United States Patent [19]

Harvey

[11] Patent Number: 4,594,991
[45] Date of Patent: Jun. 17, 1986

[54] FUEL AND WATER VAPORIZER FOR INTERNAL COMBUSTION ENGINES

[76] Inventor: Richard Harvey, 10828 Buggywhip Dr., Spring Valley, Calif. 92078

[21] Appl. No.: 700,357

[22] Filed: Feb. 11, 1985

Related U.S. Application Data

[63] Continuation-in-part of Ser. No. 539,647, Oct. 6, 1983, Pat. No. 4,498,447.

[51] Int. Cl.$^4$ .............................................. F02M 31/00
[52] U.S. Cl. .................................. 123/557; 123/25 B; 123/25 D; 123/25 P
[58] Field of Search ...................... 123/557, 558, 25 B, 123/25 D, 25 F, 25 L, 25 P, 25 J

[56] References Cited

U.S. PATENT DOCUMENTS

| | | | |
|---|---|---|---|
| 1,595,509 | 8/1976 | Field | 123/25 B |
| 3,631,843 | 1/1972 | Yeiser | 123/25 L |
| 3,968,775 | 7/1976 | Harpman | 123/25 B |
| 4,098,231 | 7/1978 | Thurston | 123/25 B |
| 4,145,998 | 3/1979 | Mahoney | 123/25 B |
| 4,286,550 | 9/1981 | Lewis | 123/25 L |
| 4,333,422 | 6/1982 | Mahoney | 123/25 B |
| 4,336,773 | 6/1982 | Carouthers | 123/25 B |

Primary Examiner—Ronald H. Lazarus
Attorney, Agent, or Firm—Charmasson & Holz

[57] ABSTRACT

A fuel mixture injection apparatus associated with the carburetor of an internal combustion engine designed to improve engine efficiency by delivering a mixture of vaporized gasoline, steam and air directly to the carburetor. A portion of the fuel supplied by the fuel pump is diverted through a metering valve into a closed chamber where it is sprayed over a perforated vaporizer grid heated by a double loop of copper tubing through which hot engine coolant is ducted. The gasoline vapor is then ducted either into the carburetor or directly into the intake manifold. Simultaneously, water from a reservoir flows through a line in response to engine load and temperature conditions. The line passes through the closed chamber where the water is preheated. The line then leads to a heat exchanger connected to the engine's exhaust manifold where the water is converted to steam. From the heat exchanger, the steam is ducted either into the carburetor or directly into the intake manifold.

2 Claims, 8 Drawing Figures

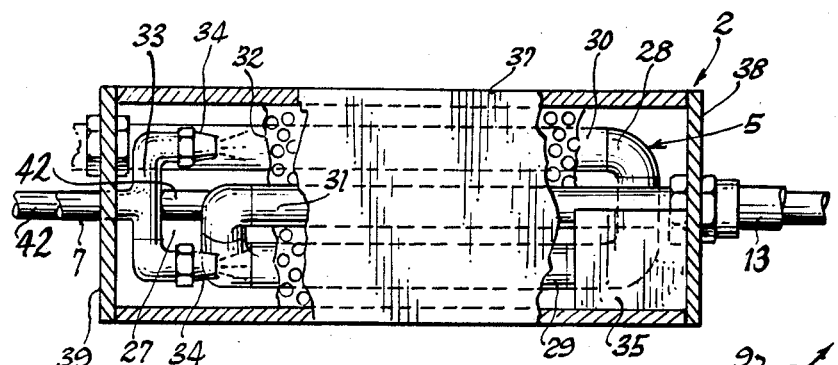
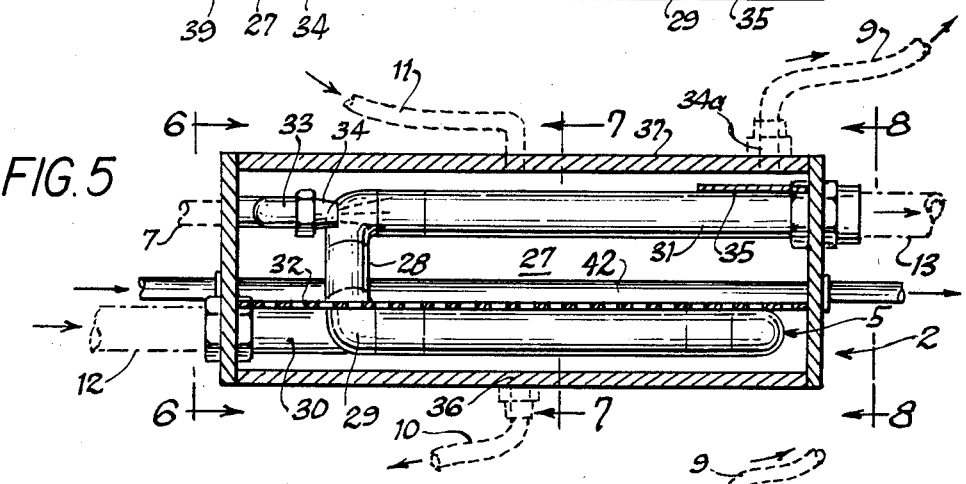
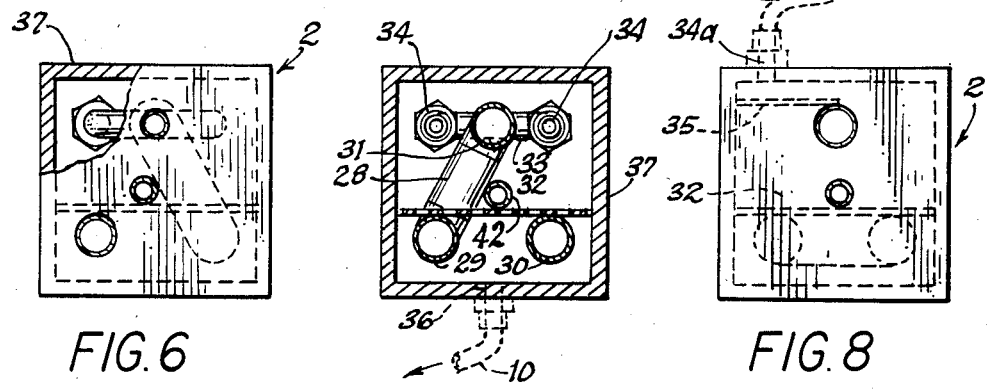

FUEL AND WATER VAPORIZER FOR INTERNAL COMBUSTION ENGINES

This is a continuation-in-part of my prior application Ser. No. 539,647 which was filed on Oct. 06, 1983, U.S. Pat. No. 4,498,447.

FIELD OF THE INVENTION

This invention relates to internal combustion engine carburetion systems, and more specifically to carburetion systems incorporating liquid injection systems and fuel pre-heating and vaporizing devices.

BACKGROUND OF THE INVENTION

It is axiomatic that the efficiency of a gasoline-powered engine can be improved by a more complete burning of the air-fuel mixture. With this realization, engine designers have attempted to maximize fuel atomization by constructing intake manifolds and combustion chambers that impart turbulence to the air/fuel mixture both before and during ignition.

Heating the fuel prior to combustion can also greatly speed the atomization process. Ideally, the fuel should be heated before it is mixed with air. Heating the air reduces engine efficiency by making the air less dense and, hence, less oxygen rich per unit volume.

It has also long been known that a liquid injection system increases fuel efficiency, allows higher power output by decreasing the tendency of the fuel to detonate before the spark plugs fire, and promotes a cleaner combustion process resulting in reduced deposit formation in the combustion chambers.

SUMMARY OF THE INVENTION

The principal objective of this invention is to provide an integrated system for creating fuel and water vapors which can be introduced either into a standard carburetor or directly into the intake manifold. The combination of steam and gasoline vapor induction provides an synergistic increase in fuel economy.

A second objective of this invention is to provide a simple and practical device which can be readily added to existing combustion engine carburetion systems, without having to modify the existing carburetor.

BRIEF DESCRIPTION OF THE DRAWINGS

FIG. 4 is a top plan view of the vaporizer chamber with a cut-away portion showing the internal components;

FIG. 5 is a front elevational view of the vaporizer chamber with the front plate removed;

FIG. 6 is a side view taken along lines 6—6 of FIG. 5;

FIG. 7 is a cross-sectional view taken along line 7—7 of FIG. 5; and

FIG. 8 is a side view taken along lines 8—8 of FIG. 5.

DESCRIPTION OF THE PREFERRED EMBODIMENT OF THE INVENTION

Figure 1:
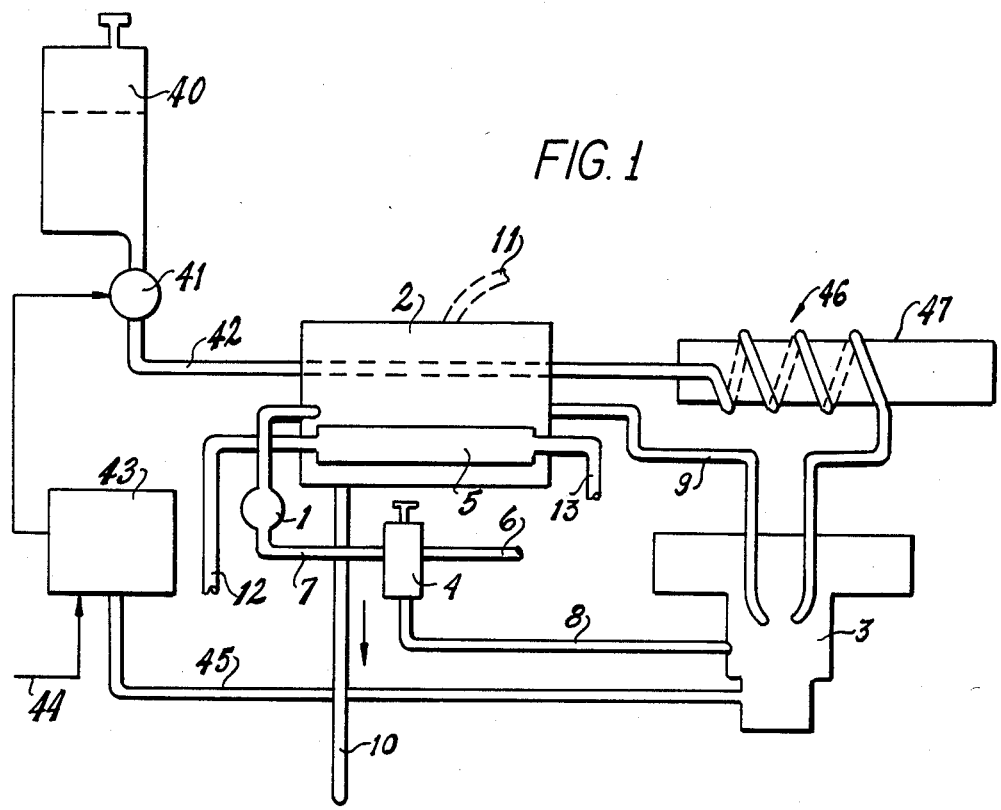
FIG. 1 is a general diagram of the fuel and water vaporization system.

FIG. 1 of the drawings is a diagrammatic representation of the vaporizing system. Gasoline delivered by the engine fuel pump is brought by primary line 11 to metering valve 12 which diverts a portion of the fuel to vaporizer chamber 13 through diversion line 14. The remaining fuel portion is delivered to the regular gasoline inlet of engine carburetor 15 through carburetor line 16. Metering valve 12 can be adjusted to vary the proportions of gasoline delivered to chamber 13 and to carburetor 15. Inside vaporizing chamber 13, hot coolant from the engine cooling system is circulated through heating element 17 by means of coolant inlet line 18 and coolant outlet line 19. Alternate systems could be implemented using electrical resistance or engine exhaust gases to heat element 17. The gasoline flowing from diversion line 14 is sprayed on heating element 17. Fuel flow through diversion line 14 is adjusted by valve 20 in response to varying engine load conditions. The gasoline vapors in chamber 13 are drawn by manifold vacuum into the venturi section of carburetor 15 through vapor feed line 21. Drain line 22 at the bottom of chamber 13 returns any unvaporized gasoline to the fuel tank.

Water stored in water reservoir 23 is delivered by metering pump 24 to the carburetor through water line 25. The output of metering pump 24 is varried according to engine temperature and load conditions which are sensed by pump controller 26 through temperature sensor 27 and manifold vacuum line 28 respectively. Enroute to the carburetor, line 25 first passes through chamber 13, where the water is preheated. After the water is preheated, it is carried to heat exchanger 29, which consists of multiple wraps of line 25 around the engine's exhaust manifold 30, where the water is converted to steam. An air inlet 31 may be provided in the upper section of chamber 13.

Since rapid vaporization of gasoline within chamber 13 will not occur until the engine coolant reaches operating temperature, it is preferable not to admit fuel into chamber 13 until such time. Adjustment of metering valve 12 may be predicated upon the type of engine, the richness of the desired fuel mixture and various other factors. Manual or automatic adjustments may be devised according to circumstances. For best results, the gasoline and water vapors should be delivered directly into the venturi section of the carburetor, or into the intake manifold. However, satisfactory operation can also be obtained by delivering the vapors directly ahead of the choke.

Figure 2:
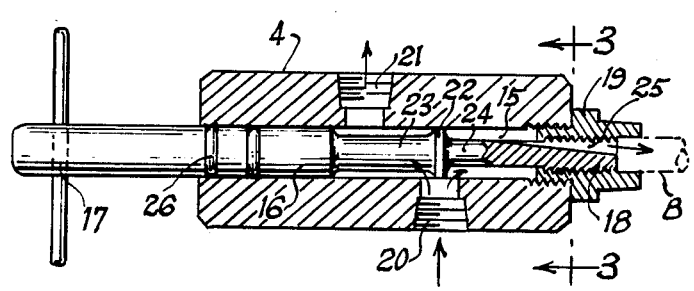
FIG. 2 is a cut-away view of the metering valve.
Figure 3:
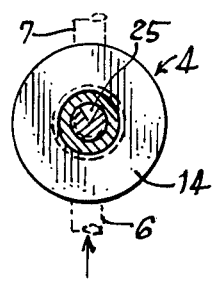
FIG. 3 is a cross-sectional view of the valve taken along lines 3—3 of FIG. 2.

FIGS. 2 and 3 illustrate the construction of metering valve 12. The valve comprises a cylindrical body 32 through which runs an axial bore 33 into which is engaged a shaft 33. One end of the shaft protruding from valve body 32 has a handle 34. The other end of the shaft is threaded and engages the internal threads of a coupling 35 forming an axial outlet port for carburetor line 16. A first radial inlet bore 36 closest to the threaded coupling 35 receives the fuel from the fuel pump through primary line 11. A second radial bore 37 delivers a portion of the fuel to vaporizer chamber 13 through diversion line 14. A gate 38, defined by an annular barrier having two smaller diameter sections 39 and 40 on either side thereof can be adjusted to span the diameter of inlet bore 36. A slanted axial notch 37 is cut into the threaded tip 41 of shaft 33, allowing fuel to pass through coupling 35 depending on the axial position of shaft 33 within cylindrical body 32. Accordingly, by turning handle 34, the quantity of fuel admitted through bore 36 can be apportioned between the carburetor line 16 or the diversion line 14 to operate the engine on unvaporized fuel sent to the carburetor only, pre-vaporized fuel only, or a combination of both. O-rings 42 near the outer end of shaft 33 prevent any leakage of fuel. The notched threaded tip 41 provides for a fine adjustment of the fuel flow toward the carburetor.

FIGS. 4 through 8 illustrate the detail of hermetically-sealed rectangular-shaped vaporizer chamber 13. Heating element 17 comprises a copper pipe 43 which connects to line 18 in the lower part of chamber 13 at one end thereof, and to line 19 in the upper part of chamber 13 at the other end. Copper pipe 43 is doubled back upon itself twice in order to span the length of the chamber three times. Two sections 44 and 45 are in the same horizontal plane close to the bottom of chamber 13. An upper section 46 stretches across the upper median part of the chamber, and connects to line 19. A grid 47 forms a perforated septum in contact with the lower sections 44 and 45. A T-coupling 48 connected to line 14 leads to a pair of nozzles 49 directed horizontally across the areas of grid 47 contiguous to pipe sections 44 and 45. Vapor outlet 50, to which is connected line 21, is located in the roof of chamber 13. A shield plate 51, located a short distance immediately below outlet 50, prevents the introduction of unvaporized gasoline into line 21. Optional air inlet line 31 enters chamber 13 through the median section of the chamber roof.

Grid 47 is designed to provide a broad heating element against which the gasoline may be sprayed. Gasoline which fails to vaporize collects at the bottom of chamber 13 and is returned to the fuel tank through line 22. The upper section 46 of copper pipe 43 is designed to maintain a high temperature in the upper part of the chamber and thus expedite and maintain the vaporization process. Air inlet line 31 may be brought to a convenient place within the engine compartment or outside it and may be fitted with a filtering mesh to prevent intake of dust and debris.

In this preferred embodiment, chamber 13 is made from a rectangular extrusion section 52 closed at both ends by end plates 53 and 54 which are maintained in place by couplings between heating pipe 43 and coolant lines 18 and 19. Water line 25 passes through end plates 53 and 54 on its way through the upper part of chamber 13, where it is in contact throughout the length of said chamber with grid 47.

In certain applications, the carburetor could be completely omitted and the engine operated only on the vapors generated by vaporizer unit.

While the preferred embodiment of the invention has been described, other embodiment may be devised and modifications may be made thereto without departing from the spirit of the invention and the scope of the appended claims.

What is claimed is:

1. In combination with a gasoline-powered internal combustion engine, and fuel supply, an apparatus for injecting a fuel mixture of vaporized fuel, fuel, steam and air into the engine carburetor which comprises:

heated means for vaporizing fuel comprising:
   a closed chamber having a fuel inlet, a vapor outlet, a perforated septum lying horizontally across the lower half of said chamber;
   a pipe passing through said chamber through which hot fluid derived from the engine cooling system is circulated; and
   means associated with said inlet for spraying fuel against said septum;

means for generating steam in proportion to the manifold vacuum created by the engine, wherein said means for generating steam comprises:
   a supply of water;
   a variable output water pump;
   means for controlling the output of said water pump in response to the intake manifold vacuum generated by the engine; and
   a heat exchanger to apply heat from the engine's exhaust manifold to the water delivered by said water pump, said heat exchanger having a conduit leading from said water pump to said carburetor; and said conduit passing through said heated means and subsequently being intimately wrapped around a portion of the exhaust manifold of said engine;

means for delivering a portion of the fuel supply through said heated means, comprising:
   a metering valve having an inlet port and first and second outlet ports;
   an adjustable gate controlling the distribution of fuel admitted through said inlet between said outlet ports;
   ducting means connecting said inlet port to a pressurized fuel supply, said first outlet port to the fuel inlet of the carburetor and said second outlet port to the fuel inlet of said chamber; and conduit means for delivering steam from said means for generating and vapor from said means for vaporizing into said carburetor.

2. The apparatus of claim 1 wherein said metering valve comprises:
   a cylindrical body having an axial bore and first and second radial bores axially spaced apart;
   a shaft engaged into the axial bore from one end of said cylindrical body;
   a part of said shaft protruding from said one end and having means for rotating the shaft;
   an internally-threaded coupling forming said first outlet port engaged into said axial bore at the other end of said cylindrical body;
   the tip of said shaft having a radial notch and threads engaging said threaded coupling; and
   said gate comprises an annular barrier on said shaft, said barrier having adjustable axial positions spanning the diameters of the radial bore closest to said threaded coupling.

* * * * *